Figure 1:
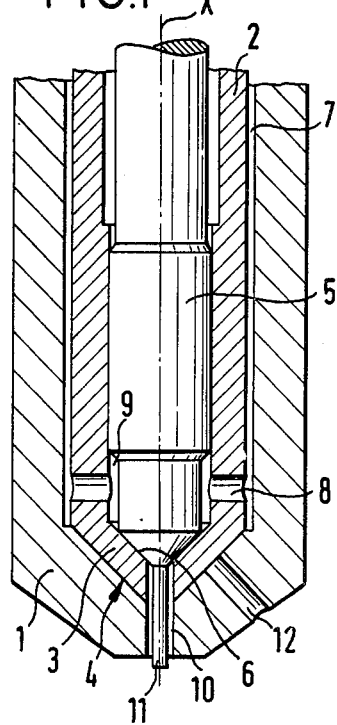

United States Patent [19]

Keiczek

[11] 4,205,790
[45] Jun. 3, 1980

[54] FUEL INJECTOR

[75] Inventor: Hubert Keiczek, Nuremberg, Fed. Rep. of Germany

[73] Assignee: Maschinenfabrik Augsburg-Nürnberg Aktiengesellschaft, Nuremberg, Fed. Rep. of Germany

[21] Appl. No.: 955,098

[22] Filed: Oct. 26, 1978

[30] Foreign Application Priority Data

Oct. 28, 1977 [DE] Fed. Rep. of Germany ....... 2748374

[51] Int. Cl.$^2$ ............................................. F02M 61/06
[52] U.S. Cl. ................................... 239/533.4; 239/563
[58] Field of Search ............... 239/533.3, 533.4, 533.5, 239/533.6, 533.7, 533.8, 533.9, 533.11, 533.12, 563, 564

[56] References Cited

U.S. PATENT DOCUMENTS

| 1,607,805 | 11/1926 | Sprado | 239/563 |
| 1,834,061 | 12/1931 | Joachim | 239/563 |
| 3,339,848 | 9/1967 | Geiger | 239/533.4 |

FOREIGN PATENT DOCUMENTS

| 313644 | 4/1956 | Switzerland | 239/533.4 |
| 146 | of 1910 | United Kingdom | 239/533.9 |

Primary Examiner—Robert W. Saifer
Assistant Examiner—Michael J. Forman
Attorney, Agent, or Firm—Becker & Becker, Inc.

[57] ABSTRACT

A fuel injector for air-compressing, direct-injection internal combustion engines. The injector essentially comprises a nozzle body, a hollow nozzle needle which is axially displaceable therein, and a second nozzle needle which is displaceable within said hollow nozzle needle. The two nozzle needles are controlled in such a way that in the lower speed and/or load range of the internal combustion engine, initially only one nozzle needle opens to release one or some of the spray holes, while the full fuel injection, which may be in different directions, occurs only at full load by opening the other nozzle needle. One of the spray holes is coaxial with the longitudinal axis of the injector, and in the closed and partly opened state of the injector, a pin of the second nozzle needle extends into this hole with clearance. The hollow nozzle needle, at that end facing the spray hole or holes, has an inclined shoulder, the external surface of which forms a valve seat for the hollow needle, and the internal surface of which forms a valve seat for the second nozzle needle.

2 Claims, 4 Drawing Figures

FUEL INJECTOR

The present invention relates to a fuel injector for air-compressing, direct-injection internal combustion engines, said injector essentially includes a nozzle body, a hollow nozzle needle which is axially displaceable therein, and a second nozzle needle which is displaceable within said hollow nozzle needle. The two nozzle needles are controlled in such a way that in the lower speed and/or load range of the internal combustion engine, initially only one nozzle needle opens to release one or some of the spray holes, while the full fuel injection, which may be in different directions, occurs only at full load by opening the second nozzle needle.

There have been earlier disclosures of injectors of this type, which were developed especially for internal combustion engines. They employ the method of wall deposition of the fuel, and feature a small diameter at that end facing the cylinder head, thus avoiding installation problems. These earlier disclosures involve hole-type nozzles, with each nozzle needle opening one or more spray holes in succession as the load or speed of the engine increases. The spray holes are disposed at an angle relative to the longitudinal axis of the injector. With these injectors, a much better mixing and combustion can be obtained over the full speed and load range of the internal combustion engine. This also results in a reduction of emission levels.

Meanwhile, however, it has been found in many cases that an even more precise control of the fuel supply enables a further improvement of engine performance if greater care is taken to always keep the injection pressure, directly at the spray hole or holes, as constant as possible. However, this is very difficult to achieve in the lower speed and load ranges. Furthermore, it has been found with different methods of injection that mixing can be considerably improved if the fuel spray, in the lower speed and/or load ranges, is introduced into the air in the combustion chamber with a higher degree of atomization, while in the upper speed and/or load ranges, an increasingly compact fuel spray is advantageous.

In order to obtain better atomization of the fuel during the injection phase, pin-type nozzles have been used for a long time. With this type of nozzle, a throttling pin provided on the nozzle needle extends into a central bore of the nozzle body, and the nozzle needle is pressed onto its seat by means of two springs having different characteristics. Depending on the fuel injection pressure, the nozzle needle is then initially lifted only partially against the force of one of the springs. Only at full injection pressure does the nozzle needle open against the force of both springs. Although this type of nozzle enables a wider spray angle, it is barely possible to obtain more precise control, and in particular a fully compact fuel spray, at full load.

It is, therefore, an object of the present invention to improve a fuel injector of the above described type so that it can be rated over the full operating range of an engine in such a way that the fuel spray will vary automatically from a wide angle sprays to a compact spray at nearly constant pressure at the spray holes.

This object, and other objects and advantages of the present invention, will appear more clearly from the following specification in connection with the accompanying drawing, in which:

FIGS. 1-4 show a longitudinal section through the lower part of four embodiments of the novel injector, which is located in the cylinder head of an internal combustion engine.

The fuel injector of the present invention is characterized primarily in that one of the spray holes is coaxial with the longitudinal axis of the injector; in the closed and partly opened state, a pin of a second nozzle extends into said hole with clearance. The fuel injector of the present invention is further characterized in that the hollow needle, at that end thereof facing the spray hole or holes, has an inclined shoulder, the external surface of which is formed as a valve seat for the hollow needle, and the internal surface of which is formed as a valve seat for the second nozzle needle.

Practically speaking, the present invention comprises a combination of a pin nozzle and a hole nozzle, the free spray area, spray location, and spray orientation of which are controlled by two operatively interdependent nozzle needles. Only in this manner is it possible to obtain precise control in conformity with the operating conditions of an engine. As soon as pressure builds up in the injector, the second nozzle needle, which produces the wide angle spray, is first gradually raised from its valve seat until it fully clears the spray hole. As the fuel injection rate increases, the hollow needle is opened, and finally, at full load, the entire fuel injection area is uncovered, so that a compact spray is produced. An additional feature, known per se, comprises providing spray holes in the nozzle body in one or more directions extending into the valve seat of the hollow needle. If necessary, these spray holes may also extend parallel to the centrally arranged spray hole and, by virtue of the shape of the hollow needle, may be arranged very close thereto.

If the same fuel spray orientation is desired both in the lower speed and/or load ranges and at full load, a further feature of the present invention provides for the centrally arranged spray hole to be oversized relative to the pin of the second nozzle needle, with an annular gap of said hole being covered in the closed condition by the inclined shoulder of the hollow needle. It is also within the scope of the present invention to overlap the pin of the second nozzle needle, with clearance, with a sleeve provided on the inclined shoulder of the nozzle needle. Adequate clearance is maintained between said sleeve and the spray hole in the closed condition. In this manner, a double pin nozzle is obtained, which, as such, will work over the full operating range of the engine.

Referring now to the drawing, in general, a nozzle body 1 has arranged therein a hollow needle 2, the upper part of which (not shown) is axially displaceably mounted. The hollow needle 2 has an inclined shoulder 3, the external surface 4 of which forms a valve seat. Inside the hollow needle 2, a second nozzle needle 5 is similarly arranged so as to be displaceable in the direction of the longitudinal axis X of the injector. The valve seat of the second nozzle needle 5 is formed by the inner surface 6 of the shoulder 3. Fuel supply is effected through an annular gap 7, bores 8, and a further annular gap 9 provided between the two nozzle needles 2, 5. The surfaces acted upon by the fuel to open individual nozzle needles 2, 5 are not shown, since their design is generally known and is not part of the present invention. At its lower flat surface, the nozzle body 1 has a spray hole 10 which is coaxial with the longitudinal axis X of the injector. A pin 11 of the pin nozzle needle 5 extends into the hole 10 with clearance.

In the embodiment illustrated in FIG. 1, a further spray hole 12 is located in the nozzle body 1 at an angle to the longitudinal axis X. The spray hole 12 extends to the valve seat 4 of the hollow needle 2.

Figure 2:
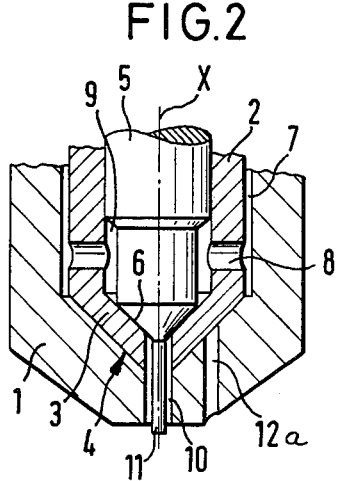

FIG. 2 shows a similar configuration, the difference being that the second spray hole 12a extends parallel to the central spray hole 10.

Figure 3:
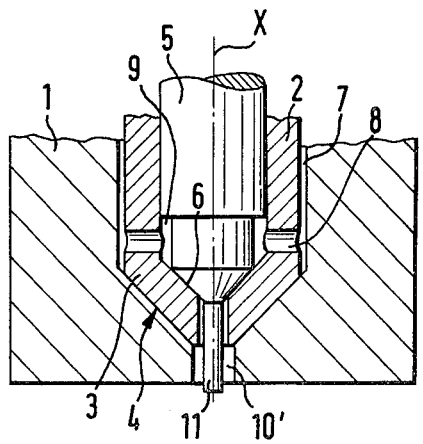

In the embodiment of FIG. 3, the centrally arranged spray hole 10' in the nozzle body 1 is made oversize; in other words, the free gap between it and the pin 11 is large. On the other hand, the clearance between the shoulder 3 and the pin 11 is narrow, with the shoulder 3 covering part of the spray hole 10'.

Figure 4:
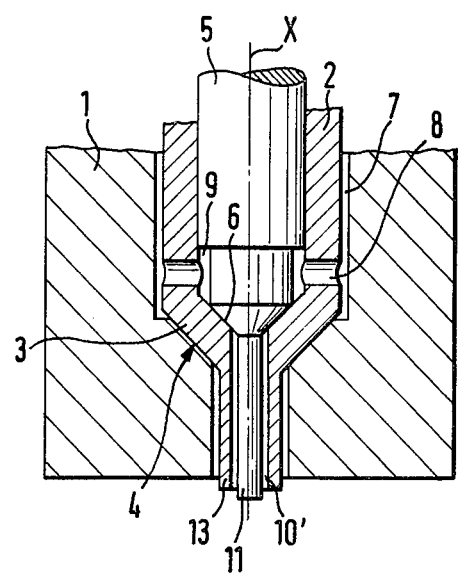

In FIG. 4, the shoulder 3 has a sleeve 13, which likewise extends into the spray hole 10' with clearance and surrounds the pin 11 with clearance.

The function of the fuel injector is the same with all of the embodiments. In the lower speed and/or load ranges of the engine, the second nozzle needle 5 is lifted first, resulting in a wide angle spray which becomes increasingly compact as the nozzle needle 5 continues to rise. As soon as the hollow needle 2 also opens, in the upper speed and/or load ranges, the full spray area is cleared and an absolutely compact fuel spray is produced.

The present invention is, of course, in no way restricted to the specific disclosure of the drawing, but also encompasses any modifications within the scope of the appended claims.

What I claim is:

1. A fuel injector, for air-compressing, direct-injection internal combustion engine, which comprises:
    a nozzle body;
    a hollow nozzle needle axially displaceable within said nozzle body;
    a second nozzle needle axially displaceable within said hollow nozzle needle;
    at least one spray hole in said nozzle body, one of said at least one spray holes being coaxial with the longitudinal axis of said nozzle body;
    a pin forming part of said second nozzle needle and extending with clearance through an opening in said hollow nozzle needle and with clearance into said coaxial spray hole when said fuel injector is in the closed and partially open states; and
    an inclined shoulder encircling said opening in said hollow nozzle needle and forming that end of said hollow nozzle needle facing said at least one spray hole, the external surface of said shoulder forming a valve seat for said hollow nozzle needle, and the internal surface of said shoulder forming a valve seat for said second nozzle needle, said nozzle needles being operable in response to the speed and load of said engine in such a way that during the lower speed and load ranges initially only said second nozzle needle opens to release at least said coaxial spray hole, and at full load said hollow nozzle needle also opens to permit full fuel injection, said shoulder of said hollow nozzle needle including a sleeve which extends into said coaxial spray hole with clearance when said fuel injector is in the closed state, also at least partially surrounding said pin of said second nozzle needle with clearance.

2. A fuel injector according to claim 1, in which said coaxial hole is oversize relative to said pin of said second nozzle needle and is partially covered by said shoulder of said hollow nozzle needle when said fuel injector is in the closed state.

* * * * *